(12) United States Patent
Singhe

(10) Patent No.: US 9,248,424 B2
(45) Date of Patent: Feb. 2, 2016

(54) PRODUCTION OF METHANE FROM ABUNDANT HYDRATE DEPOSITS

(71) Applicant: Upendra Wickrema Singhe, Houston, TX (US)

(72) Inventor: Upendra Wickrema Singhe, Houston, TX (US)

( * ) Notice: Subject to any disclaimer, the term of this patent is extended or adjusted under 35 U.S.C. 154(b) by 0 days.

(21) Appl. No.: 13/898,114

(22) Filed: May 20, 2013

(65) Prior Publication Data

US 2013/0341179 A1 Dec. 26, 2013

Related U.S. Application Data

(63) Continuation-in-part of application No. 13/758,202, filed on Feb. 4, 2013, now abandoned, and a continuation of application No. 13/528,057, filed on Jun. 20, 2012, now abandoned.

(60) Provisional application No. 61/498,861, filed on Jun. 20, 2011.

(51) Int. Cl.
*B01J 19/12* (2006.01)
*E21B 7/14* (2006.01)
*E21B 43/16* (2006.01)
*E21B 43/01* (2006.01)

(52) U.S. Cl.
CPC .............. *B01J 19/121* (2013.01); *B01J 19/128* (2013.01); *E21B 7/14* (2013.01); *E21B 43/16* (2013.01); *B01J 2219/0879* (2013.01); *E21B 2043/0115* (2013.01)

(58) Field of Classification Search
CPC ............ B01J 19/121; B01J 2219/0879; B01J 19/128; E21B 7/14; E21B 43/16; E21B 2043/0115

USPC ......................... 204/158.21, 157.15; 422/105
See application file for complete search history.

(56) References Cited

U.S. PATENT DOCUMENTS 4,227,582 A * 10/1980 Price .............................. 175/12
5,950,732 A * 9/1999 Agee et al. ............... 210/170.11
(Continued)

FOREIGN PATENT DOCUMENTS

JP 2006046009 A * 2/2006
JP 2009046882 A * 3/2009

OTHER PUBLICATIONS

Ryskin, "Methane-driven oceanic eruptions and mass extinctions," Geology, Sep. 2003, v. 31, No. 9, pp. 741-744.*
(Continued)

*Primary Examiner* — Keith Hendricks
*Assistant Examiner* — Colleen M Raphael
(74) *Attorney, Agent, or Firm* — Spradley PLLC; Michael Spradley

(57) ABSTRACT

Methods of dissociating and recovering methane from solid hydrate deposits are provided. A method for recovering methane from a methane hydrate includes at least applying electromagnetic radiation to the methane hydrate to dissociate the methane-water bond. Further provided is an apparatus for dissociating methane from a methane hydrate. The apparatus includes at least: an electromagnetic spectrum power source; a probe connected to the electromagnetic spectrum power source; an antenna connected to the distal end of the probe is capable of focusing a radiated beam into a target area of a methane hydrate; and a control system in communication with and capable of controlling the electromagnetic spectrum power source, the probe, and the antenna.

12 Claims, 3 Drawing Sheets

(56) References Cited

U.S. PATENT DOCUMENTS

| | | | |
|---|---|---|---|
| 6,214,175 B1* | 4/2001 | Heinemann et al. | 204/157.15 |
| 6,267,849 B1* | 7/2001 | Taylor et al. | 204/157.9 |
| 6,299,256 B1* | 10/2001 | Wyatt | 299/8 |
| 6,880,646 B2* | 4/2005 | Batarseh | 219/121.66 |
| 6,994,159 B2* | 2/2006 | Wendland | 166/57 |
| 7,490,664 B2* | 2/2009 | Skinner et al. | 175/12 |
| 7,546,880 B2* | 6/2009 | Zhang et al. | 175/16 |
| 2001/0020178 A1* | 9/2001 | Arndt et al. | 607/101 |
| 2002/0169345 A1* | 11/2002 | Johnson | 422/255 |
| 2007/0131591 A1* | 6/2007 | Pringle | 204/157.15 |
| 2007/0267220 A1* | 11/2007 | Magiawala et al. | 175/12 |
| 2010/0006287 A1* | 1/2010 | Schicks | 166/272.1 |
| 2011/0064644 A1* | 3/2011 | McAlister | 423/445 R |
| 2011/0284231 A1* | 11/2011 | Becker | 422/22 |
| 2013/0074757 A1* | 3/2013 | McAlister | 422/187 |

OTHER PUBLICATIONS

Fujioka et al, "Extraction of Methane from Methane Hydrate Using Lasers," Jpn. J. Appl. Phys. vol. 42 (2003) pp. 5648-5651, Part 1, No. 9A, Sep. 2003.*

Josui et al, "Excavation of methane hydrate using COIL," Proc. of SPIE vol. 6101 (2006), pp. 61027/1-61027/5.*

Sugimoto et al, "Chemical oxygen-iodine laser technologies for methane hydrate," Proc. of SPIE vol. 5627 (2005), pp. 517-521.*

* cited by examiner

PRODUCTION OF METHANE FROM ABUNDANT HYDRATE DEPOSITS

FIELD OF THE INVENTION

The present invention relates generally to methods of producing methane, and in particular though non-limiting embodiments, to methods of producing gaseous methane from solid hydrate deposits, and unblocking pipelines and equipment and clearing drill sites of hydrate deposits using electromagnetic resonance.

BACKGROUND

The existence of large deposits of methane hydrate can be found in abundant quantities in the deep oceans around the United States, particularly in Arctic Ak. and the Gulf of Mexico. The U.S. Geological Survey ("USGS") estimates that methane hydrate may contain more organic carbon than all of the world's coal, oil, and non-hydrate gas combined. Furthermore, the USGS indicates that the United States alone may possess 200 quadrillion cubic feet of natural gas in the form of hydrates. To put this figure in perspective, the world's proved natural gas reserves are on the order of 6 quadrillion cubic feet. These reserves are enough to make a significant contribution towards energy independence and enhancing security.

In the broadest possible terms, a methane hydrate (or a "hydrate") is a clathrate; that is one compound, (methane), nested within the lattice of another (ice). The challenge lies in separating the methane from the ice lattice, without letting the methane escape to the atmosphere, in a manner that makes methane hydrates more economically feasible than conventional deep water hydrocarbons.

Normally, methane gas, like all fossil fuels, is formed by the decomposition of marine life combined with the pressure of depth and sediment. However, when this decomposition occurs under freezing temperatures and high pressure, each molecule of methane gas naturally forms within a crystalline shell of ice. The ice molecules are bound to each other by hydrogen bonds in a tight polyhedral cage structure, while the methane forms and is trapped within the spaces of the tightly-bound ice cage. The methane within the ice molecules, if it can be captured, is natural gas, a vital fuel source. By the same token, if the ice lattice melts, the methane is released to the atmosphere, contributing to greenhouse gases.

Methane hydrates can also be formed by human activity, creating hazards in conventional deep sea oil and gas production. Oil and gas activities in areas such as the Gulf of Mexico now extend into ocean depths where hydrates naturally occur at the sea floor. As conventional gas is extracted from the frozen, highly pressurized seabed, drill operators must pump hot oil from the surface to prevent hydrate formation within the drilling pipeline.

At best, this method is costly and inefficient. It is only a small improvement over the century-old method of circulating methanol or monoethylene gycol to arrest hydrate crystal formation. More troublingly, the USGS warns that pumping hot oil or chemicals near these seabeds can cause warming of sediments and dissociation of methane from hydrates at the sea floor. In turn, this haphazardly weakens seabed sediment structures and creates pockets of highly pressured methane gas. This condition could lead to blowouts, loss of seabed support for pipelines, and possible underwater landslides, all in addition to the release of unused methane into the atmosphere.

Although methane and methane hydrates are well-known, industry has not yet developed a way to reliably obtain hydrates from the sea floor. Attempts to draw the hydrates to the surface intact cause the ice to melt, allowing methane to release to the atmosphere. Furthermore, recent attempts to manipulate temperature and pressure are not economical enough to allow commercialization.

In order to produce methane from hydrates and to prevent hydrates from clogging deep water drilling activity, the formation and dissociation of methane and hydrate crystals needs to be precisely controlled. At present, there are three well-documented methods with the potential to unlock and produce the gas trapped in gas hydrate deposits, which are:

Reducing the reservoir pressure below the hydrate-equilibrium pressure;

Injecting chemicals into the hydrate layer that will cause dissociation; and

Increasing reservoir temperature above the hydrate equilibrium temperature.

Depressurization is impractical for some gas hydrate deposits, due to the large drawdown required to reduce the reservoir pressure below the hydrate equilibrium pressure. Some deposits in the Arctic regions that contain substantial free gas below the gas hydrate may be produced on depressurization, but this method is not feasible if free gas is non-existent or small as in the case of major hydrate deposits located in deep oceans. Furthermore, for offshore deposits where the pressure and temperature in the gas hydrate deposits are not near the equilibrium line, depressurization will not produce gas from the hydrate layer.

Chemical injection is not feasible on a commercial scale due to the high cost of chemicals, the inability to deliver the chemicals to a specific location in a hydrate reservoir, and the potential of polluting the environment—particularly, the water table.

Presently, the most applicable method for producing gas hydrates is to increase the temperature of the hydrates. The inability to deliver hot water or other heat media to a specific location, however, renders it impractical and ineffective due to high energy consumption and resulting costs.

Recognizing the energy independence potential of methane hydrates, the USGS has spent several years investigating the properties and energy potential of methane hydrates as a fuel source. In addition, legislation has sought to provide incentives for oil and gas developers to develop the critical technology needed for progress on this front. To date, the leading U.S. proposal is to use depressurization to extract methane from the methane hydrates. As depressurization is not economically feasible at commercially viable quantities, this method has not been implemented.

The U.S. is not alone in seeking a way to access the energy in methane hydrates. Germany, South Korea, China, Japan, and India have all made large financial commitments in locating and developing methane hydrates as a fuel source. China in particular is considering the use of drilling and heating pipes to develop the methane hydrates in its coastal seabeds. As outlined above, this method is not only inefficient, it can create its own environmental problems.

Meanwhile, Japan has built what it calls the world's largest research drilling ship to prospect for deep sea methane hydrates, and India has already invested more than $300 million U.S. dollars in discovering a methane hydrate-rich layer of sediment in the Indian Ocean. In addition, Germany is working on a method in which, under the right pressure conditions, the methane within the hydrate lattice is extracted and exchanged for carbon dioxide molecules.

Still other companies and individuals are searching for alternative fuel sources. Some have touted the production of shale gas. However, shale gas is not the solution, due to the need for fracking, which pollutes the water table.

There is, therefore, a long-standing yet unmet need for methods of producing methane from hydrates and preventing hydrate formation during deep water drilling activities that are safe, reliable, and environmentally friendly, while still economical on a commercial scale.

SUMMARY

Methods of recovering methane from solid hydrate deposits are provided. A method for recovering methane from a methane hydrate includes at least applying electromagnetic radiation to the methane hydrate to dissociate the methane-water bond. A method for recovering methane from a methane hydrate located beneath the ocean's floor is also provided. The method includes at least: enclosing the methane hydrate in a caisson; positioning an electromagnetic spectrum power source inside of the caisson; delivering electromagnetic radiation to the methane hydrate with the electromagnetic spectrum power source; dissociating methane hydrate into methane and water; and recovering methane from the water.

Further provided is an apparatus for dissociating methane from a methane hydrate. The apparatus includes at least: an electromagnetic spectrum power source; a probe connected to the electromagnetic spectrum power source; an antenna connected to the distal end of the probe, which is capable of focusing a radiated beam into a target area of the methane hydrate; and a control system in communication with and capable of controlling the electromagnetic spectrum power source, the probe, and the antenna.

BRIEF DESCRIPTION OF THE DRAWINGS

For a further understanding of the nature, objects, and advantages of the present invention, reference should be had to the followed description, read in conjunction with the following drawings, wherein like reference numerals denote like elements and wherein.

DETAILED DESCRIPTION OF SEVERAL EXAMPLE EMBODIMENTS

Figure 1:
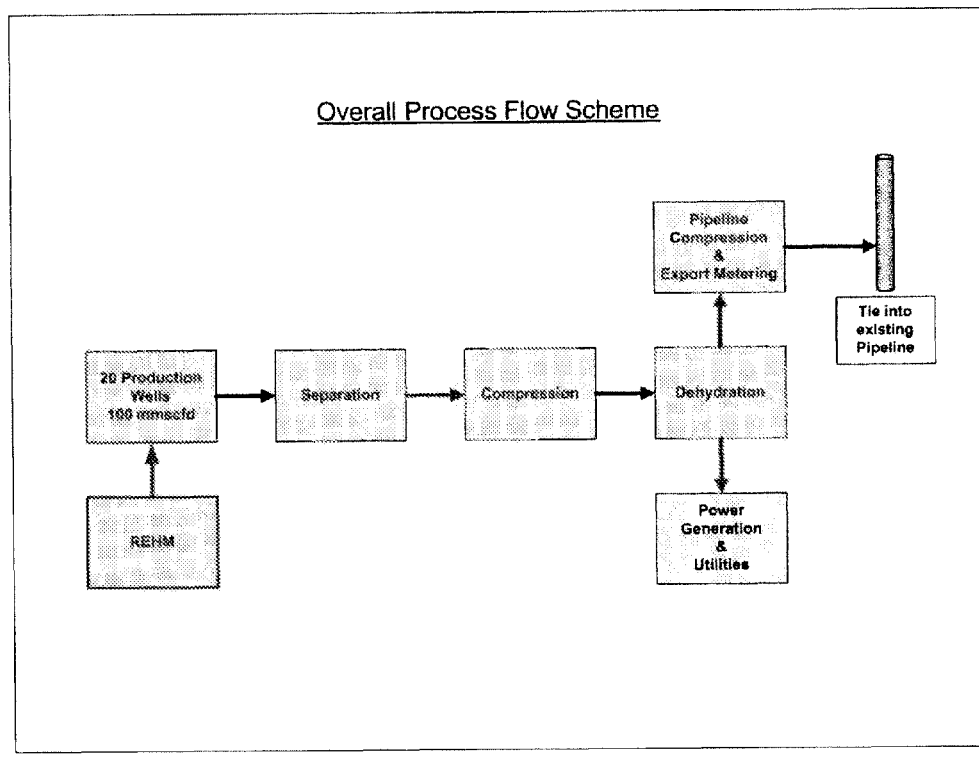
FIG. 1 is a schematic diagram showing the major components according to one embodiment, namely, the dissociation of hydrate deposits located on the ocean's floor.

According to example embodiments, electromagnetic radiation is applied to the clathrate to dissociate the methane-water bond within the clathrate using the principle of electromagnetic resonance ("EMR"). According to further example embodiments, frequencies in the infrared region are used, which allows for the highly selective and efficient use of energy for dissociation without the wasted methane or environmental repercussions of existing thermal, pressure, and chemical methods of dissociation. In still further embodiments, methane extracted from hydrate using the application of electromagnetic radiation decreases U.S. greenhouse gas emissions by about 50%.

According to example embodiments, a computer simulation based on a model optimizes the spectra and energy usage needed for specific methane hydrate reservoir characteristics and properties.

By controlling and customizing spectra, it is possible to (1) dissociate methane hydrate; (2) maximize propagation within the reservoir; (3) minimize energy usage; and (4) maximize energy transfer efficiency.

An example embodiment uses electromagnetic wave ablation to dissociate methane hydrate into its constituent compounds, methane and water. The process is essentially one of energy transfer by the use of electromagnetic radiation. In example embodiments, the process involves the selective transfer of energy to specific methane hydrates at the molecular level.

According to example embodiments, the excitation from a specific wave spectra and resonance frequency breaks down the clathrate's ice cage at a low power level. In still further embodiments, the absorption band of electromagnetic radiation propagates through the ice or other media and reaches only the precise methane hydrates identified for dissociation. According to example embodiments, the dissociation takes place in a caisson, thus avoiding environmental impact. Once dissociated from the clathrate, the resulting methane is then separated, transported, and processed in the ordinary manner using technologies presently known in the art.

According to example embodiments, the resonant frequencies for the breakup of isolated methane from the hydrate cage are in the infrared region of the electromagnetic spectrum. According to further embodiments, the frequency range is between about 23 THz and about 30 THz, wherein the higher frequencies are accessible via a $CO_2$ laser. By employing a $CO_2$ laser, it is possible to "twitch" the oxygen atoms in the cage.

According to example embodiments, the major components of an ablation apparatus include:

(A) an electromagnetic spectrum power source with selectable points in the spectrum, (B) a probe/transmission line, (C) an antenna at the distal end of a probe, focusing the radiated beam into the targeted area, and (D) a proprietary control design.

In further example embodiments, electromagnetic energy is delivered via a delivery probe to a precise location. The source generates power at a controlled level of a chosen frequency. Unlike the prior art, example embodiments are controllable and focused on the gaseous methane release, with an energy input directly proportional to the size of the release.

In still other example embodiments, the antenna focuses the radiated beam so that most of the energy is deposited within the targeted area. By suitable choice of the power delivered, pulse duration, frequency, and antenna design (which affects the width of the radiated beam), efficient use of energy is achieved. In other embodiments, for safety, the control system of the apparatus provides for automatic shut-off in the event of an inappropriate power level, excessive reflected power, unsuitable pulse duration, or heating beyond prescribed limits.

According to further example embodiments, energy requirements are minute in comparison to heat, chemical or pressure manipulation methods of dissociating methane hydrates. Unlike the indiscriminate application of heat, example embodiments allow precise control of the dissociation process, thereby preventing release of methane to the atmosphere and damage to the seabed structure. Furthermore, example embodiments do not leave any residual chemicals which can damage the water table.

Figure 2:
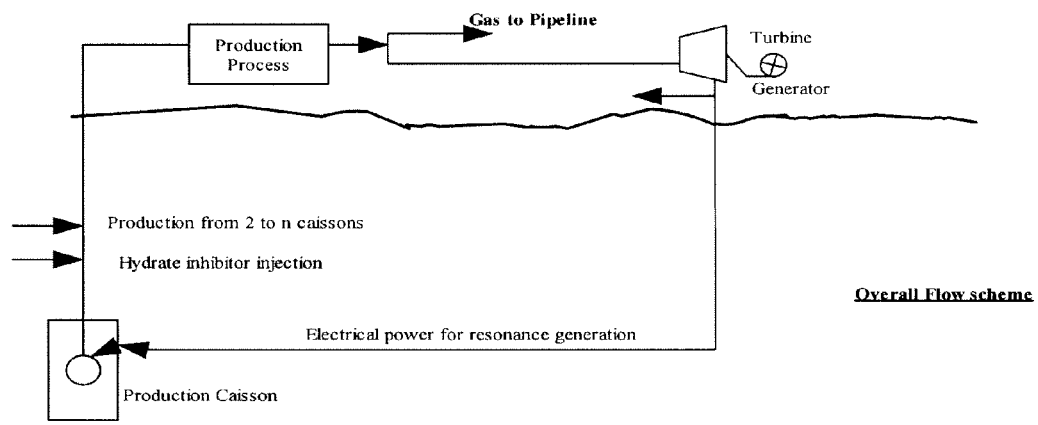
FIG. 2 is a schematic diagram showing the use of multiple major components according to a further embodiment.
Figure 3:
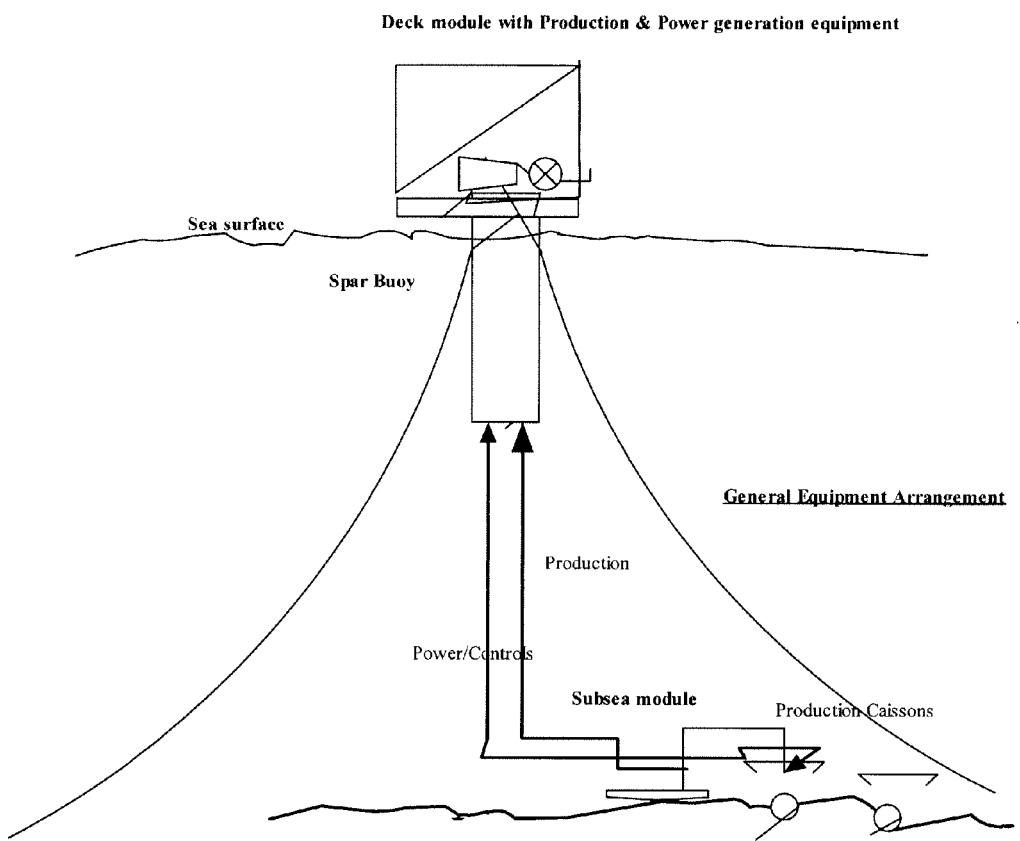
FIG. 3 is an overall process flow diagram, using an example embodiment to produce methane from hydrate deposits located on the ocean's floor.

The overall process flow scheme and major equipment is shown in FIGS. 1 through 3.

Turning now to FIG. 1, in an example embodiment, a Spar Buoy 100 (thirteen of which are currently installed in the Gulf of Mexico) or a similar type deepwater facility 100 houses the production equipment 102. The production zone comprising clathrates 103 at or beneath the sea bottom 105 are encased in caissons or suction piles 104 that connect to shore and the facility 100 via pipelines 106. An electromagnetic spectrum power source (not shown) is placed inside of the caisson or suction pile 104. A control umbilical 107 is used to regulate and power the electromagnetic spectrum power source and the subsea control module 108 below the sea surface 101, remotely from the Spar Buoy 100.

Because example embodiments allow for dissociation at the seabed point of extraction, existing industry infrastructure and technology can be leveraged to develop and commercialize the resulting methane as fuel or convert it into liquid phase for other applications.

Turning now to FIG. 2, according to example embodiments, following the dissociation of methane from the clathrate 102 in the production caisson 201, the dissociated methane and water are transported in subsea pipelines 202 and separated and processed in the ordinary manner using known technologies 203. In further example embodiments, multiple caissons 201 are used, and the subsea pipelines 202 from each are joined prior to the dissociated methane and water entering the production process 203. In still further embodiments, a hydrate inhibitor 204 is injected in the subsea pipelines 202 to prevent the formation of hydrates in the subsea pipelines 202. The processed methane exits the production process 203 through a product pipeline 205 for distribution.

Turning now to FIG. 3, an overall process flow scheme 300 is disclosed. According to example embodiments, the electromagnetic resonance process in a caisson 301 occurs in multiple locations, for example, in 20 production wells 302 at a production rate of 100 mmscfd. However, fewer or more production wells are contemplated for a given application and location. Following the dissociation of the methane, the methane/water mixture enters a separation process 303, followed by a compression step 304. The processed methane is then dehydrated 305. The methane is used directly for power generation and utilities 306, or may alternatively or additionally be further processed for pipeline compression and export metering 307. The produced methane is tied into existing pipelines 308 for exportation.

In other example embodiments, the disclosed technology is used to enhance drilling safety. In one embodiment, the technology is used as a tool for efficient clearing of well bores, platform installations, and well sites. These mid-depth hydrate deposits are unstable, exposing the equipment and workforce to imminent dangers.

In still further embodiments, the technology is applied to deep water flow lines in conjunction with pigging systems for unblocking pipelines.

In another example embodiment, the disclosed technology is used in conjunction with leak containment systems, to avoid blockage due to the formation of hydrates.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A method for dissociating methane from hydrate deposits, comprising:
providing a control system that controls an electromagnetic spectrum power source, said control system controlling said electromagnetic spectrum power source to deliver electromagnetic radiation to a hydrate deposit, said electromagnetic radiation in a frequency range of about 23 THz to about 30 THz.

2. The method of claim 1, further comprising applying electromagnetic radiation to a hydrate deposit located beneath the ocean's floor.

3. The method of claim 1, further comprising applying electromagnetic radiation to a hydrate deposit located in a well bore.

4. The method of claim 1, further comprising applying electromagnetic radiation to a hydrate deposit located in a deep water flow line.

5. The method of claim 1, further comprising applying electromagnetic radiation to a hydrate deposit in conjunction with leak containment systems.

6. A method for recovering from a methane hydrate, comprising:
providing a control system that controls an electromagnetic spectrum power source, said control system controlling said electromagnetic spectrum power source to deliver electromagnetic radiation to a methane hydrate to dissociate the methane-water bond, said electromagnetic radiation in a frequency rage of about 23 THz to about 30 THz.

7. The method of claim 6, further comprising applying electromagnetic radiation with a $CO_2$ laser.

8. A method for recovering methane from a methane hydrate located beneath the ocean's floor, comprising:
enclosing the methane hydrate in a caisson;
positioning an electromagnetic spectrum power source inside of the caisson;
providing a control system that controls said electromagnetic spectrum power source, said control system controlling said electromagnetic spectrum power source to deliver electromagnetic radiation to the methane hydrate, said electromagnetic radiation in the frequency range of about 23 THz to about 30 THz;
disassociating methane hydrate into methane and water; and recovering methane from the water.

9. The method of claim 8, further comprising delivering electromagnetic radiation to the methane hydrate with a $CO_2$ laser.

10. An apparatus for dissociating methane from a methane hydrate, comprising:
an electromagnetic spectrum power source, wherein the electromagnetic spectrum power source comprises selectable points in the electromagnetic spectrum, said points between about 23 THz to about 30 THz;
a probe connected to the electromagnetic spectrum power source;
an antenna connected to the distal end of the probe, wherein the antenna is capable of focusing a radiated beam into a target area of a methane hydrate; and
a control system that controls said electromagnetic spectrum power source, said control system controlling said electromagnetic power source to deliver electromagnetic radiation to the methane hydrate using said probe and said antenna, said electromagnetic radiation at a frequency range defined substantially by said selectable points.

11. The apparatus of claim 10, wherein the control system is capable of automatically shutting off the electromagnetic spectrum power source in the event of certain pre-defined conditions.

12. The apparatus of claim 11, wherein the pre-defined conditions comprise at least: an inappropriate power level, an excessive reflected power, an unsuitable power duration, or heating beyond prescribed limits.

* * * * *